(12) United States Patent
Shenoi

(10) Patent No.: US 7,349,401 B2
(45) Date of Patent: Mar. 25, 2008

(54) BONDED G.SHDSL LINKS FOR ATM BACKHAUL APPLICATIONS

(75) Inventor: Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 1122 days.

(21) Appl. No.: 10/156,171

(22) Filed: May 28, 2002

(65) Prior Publication Data

US 2003/0048802 A1 Mar. 13, 2003

Related U.S. Application Data

(60) Provisional application No. 60/322,608, filed on Sep. 17, 2001, provisional application No. 60/317,353, filed on Sep. 5, 2001.

(51) Int. Cl.
*H04L 12/56* (2006.01)
(52) U.S. Cl. .................. 370/395.1; 370/400; 370/535; 370/536
(58) Field of Classification Search .................... None
See application file for complete search history.

(56) References Cited

U.S. PATENT DOCUMENTS

| | | | | |
|---|---|---|---|---|
| 5,287,349 A | * | 2/1994 | Hyodo et al. | 370/399 |
| 5,541,926 A | * | 7/1996 | Saito et al. | 370/474 |
| 6,002,670 A | * | 12/1999 | Rahman et al. | 370/238 |
| 6,075,788 A | * | 6/2000 | Vogel | 370/395.51 |
| 6,147,997 A | * | 11/2000 | Holden et al. | 370/395.1 |
| 6,205,142 B1 | * | 3/2001 | Vallee | 370/394 |
| 6,618,374 B1 | * | 9/2003 | Buckland et al. | 370/394 |
| 6,690,718 B1 | * | 2/2004 | Kim | 375/222 |
| 6,967,952 B1 | * | 11/2005 | Akers et al. | 370/395.1 |
| 2003/0123487 A1 | * | 7/2003 | Blackwell et al. | 370/485 |

OTHER PUBLICATIONS

"Symmetricom Extends Broadband Market Focus With Preview of New GoWide Integrated Access Device" as acquired from http://www.symmetricom.com/new/060501_01.html, Nov. 28, 2001.

* cited by examiner

*Primary Examiner*—Wing Chan
*Assistant Examiner*—Brian Roberts
(74) *Attorney, Agent, or Firm*—Patterson & Sheridan, LLP

(57) ABSTRACT

Systems and methods are described for deploying bonded G.shdsl links for ATM backhaul applications. A method includes transporting digital data including: coupling a first end of a plurality of unbundled network elements to a first modem; coupling a second end of the plurality of unbundled network elements to a second modem; providing the first modem with a first single stream of asynchronous transfer mode cells; sequence-cell division multiplexing to divide the first single stream of asynchronous transfer mode cells into a plurality of streams of cells at the first modem; transmitting the plurality of streams of cells to the second modem via the plurality of unbundled network elements; and sequence-cell division demultiplexing to bond the plurality of streams of cells into a second single stream of asynchronous transfer mode cells at the second modem. An apparatus includes an asynchronous transfer mode connection; a line interface unit and framer coupled to the asynchronous transfer mode connection; an utopia bus coupled to the line interface unit and framer; a bonding engine coupled to the utopia bus; and a plurality of G.shdsl transceivers coupled to the bonding engine.

21 Claims, 12 Drawing Sheets

BONDED G.SHDSL LINKS FOR ATM BACKHAUL APPLICATIONS

CROSS-REFERENCES TO RELATED APPLICATIONS

This application is related to, and claims a benefit of priority under 35 U.S.C. 119(e) from, now abandoned U.S. Ser. No. 60/322,608, filed Sep. 17, 2001; now abandoned U.S. Ser. No. 60/317,353, filed Sep. 5, 2001; and copending U.S. Ser. No. 10/156,217, filed on May 28, 2002, the entire contents of all of which are hereby expressly incorporated by reference for all purposes.

BACKGROUND OF THE INVENTION

1. Field of the Invention

The invention relates generally to the field of communication networks. More particularly, the invention relates to the transport of digital data over subscriber loops and ATM networks. Specifically, the invention relates to deploying G.shdsl in backhaul applications.

2. Discussion of the Related Art

G.shdsl represents an international standard for transporting digital data over subscriber loops. The G.shdsl standard is established by the ITU-T as G.991.2. It provides a method for transporting a full-duplex bit-stream of up to 2.3 Mbps over short loops. The standard provides for operation that is rate-adaptive in nature, supporting payload rates ranging from 2.3 Mbps over 6 kft (26-AWG) loops to 192 kbps over loops as long as 18 kft (again, 26-AWG). A T1 rate (1.544 Mbps) can be supported over loops as long as 9 kft (26-AWG). This data distance profile (DDP) takes into consideration very high levels of cross-talk from adjacent loops in the same binder group. In conditions of low-noise, the capacity is much greater.

The encoding method specified for G.shdsl, known as trellis-coded pulse amplitude modulation ("TC-PAM"), is well suited for combating interference while being spectrally friendly with respect to other services carried over loops in the same binder group. The reach at a given data rate is longer when there is less interference. Several chip manufacturers provide proprietary extensions of the G.shdsl standard for improving the DDP.

There are numerous situations where a digital bit-stream needs to be delivered between a location, such as a cellular base-station or remote access multiplexer, and a central office. The bit-stream is usually a DS1 ("T1"; 1.544 Mbps) or DS3 ("T3"; 44.736 Mbps). More often than not, the DS1 is a framed signal, with a payload of 1.536 Mbps organized as a collection of DS0s; the DS3 is usually formatted with ATM cells and is "partially" full, corresponding to a data rate utilization of about 10 to 15 Mbps (filler ATM cells and DS3-specific overhead bring the rate up to 44.736 Mbps).

Referring to FIG. 1, a bock diagram of a DS3 backhaul application scenario is depicted. FIG. 1 depicts a situation where a competitive local exchange carrier (CLEC) has deployed a remote digital subscriber line access multiplexer (DSLAM) 110 for serving subscribers at a distance from the central office (CO). The CLEC would most likely deploy other equipment, such as DSLAMs and aggregation devices in the CO, renting space from the incumbent local exchange carrier (ILEC) in what is called a collocation arrangement (COLO). A plurality of subscriber DSL lines 100 is coupled to a remote DSLAM 110. The remote DSLAM 110 is coupled to a DS3 line 130 in a DS3 facility 131 via a DS3 connection 120. The DS3 line 130 is one of a plurality of lines 140. The plurality of lines 140 is coupled to an aggregation device 150.

The network side interface of the remote DSLAM 110 is a DS3 formatted stream of ATM cells, and, depending on the services provided and number of subscribers served, is most likely to be only partially occupied ("fractional-DS3"). However, the CLEC 160 must lease a complete DS3 line 130 from the ILEC to interconnect the remote DSLAM 110 to COLO-based aggregation equipment. The cost to the CLEC 160 for the leased DS3 line 130 can be quite high, depending on distance and market (geographic location). The business constraint of having to lease a complete DS3 line for a fractional application represents a problem (inefficiency) for the CLEC. What is needed is an approach that is less costly for the CLEC.

Another problem with this technology has been that, generally speaking, the capacity of a loop measured in terms of bit-rate, decreases as the loop length increases. It is not uncommon for the required capacity (demand) to exceed the carrying capacity. For example, in the case of DS1 backhaul, the objective is to transport 1.544 Mbps (or 1.536 Mbps) over the loop. If the length of the loop is 15 kft (26 AWG), then such a loop is incapable of achieving this objective since the length limits the rate to 192 kbps discussed above.

One unsatisfactory approach in an attempt to solve the above-discussed capacity problem involves deploying repeaters. The G.shdsl standard explicitly describes repeater operation. However, repeaters can be expensive, and their installation is not always feasible depending on geography and power requirements. What is needed is a solution that meets the above-discussed requirements in a more cost-effective manner.

Heretofore, the requirements for deploying G.shdsl in a backhaul application over long loops in a cost-effective and practical manner have not been fully met. What is needed is a solution that addresses these requirements.

SUMMARY OF THE INVENTION

There is a need for the following embodiments. Of course, the invention is not limited to these embodiments. According to an aspect of the invention, a method comprises transporting digital data including: coupling a first end of a plurality of unbundled network elements to a first modem; coupling a second end of the plurality of unbundled network elements to a second modem; providing the first modem with a first single stream of asynchronous transfer mode cells; sequence-cell division multiplexing to divide the first single stream of asynchronous transfer mode cells into a plurality of streams of cells at the first modem; transmitting the plurality of streams of cells to the second modem via the plurality of unbundled network elements; and sequence-cell division demultiplexing to bond the plurality of streams of cells into a second single stream of asynchronous transfer mode cells at the second modem. According to another aspect of the invention, a method comprises: sequence-cell division multiplexing to divide a single stream of asynchronous transfer mode cells into a plurality of streams of cells at a first modem; and transmitting each of the plurality of streams of cells to a second modem via a plurality of unbundled network elements. According to another aspect of the invention, a method comprises: receiving a plurality of streams of cells at a modem via a plurality of unbundled network elements; and sequence-cell division demultiplexing to bond the plurality of streams of cells into a single stream of asynchronous transfer mode cells at the modem.

According to another aspect of the invention, an apparatus comprises: an asynchronous transfer mode connection; a DS3 line interface unit and framer coupled to the asynchronous transfer mode connection; an utopia bus coupled to the DS3 line interface unit and framer; a bonding engine coupled to the utopia bus; and a plurality of G.shdsl transceivers coupled to the bonding engine.

According to another aspect of the invention, a method comprises transporting digital data including: coupling a first end of a plurality of unbundled network elements to a first modem; coupling a second end of the plurality of unbundled network elements to a second modem; applying a single signal to the first modem; sequenced-cell division multiplexing the single signal into a plurality of signals at the first modem; transmitting the plurality of signals to the second modem over the plurality of unbundled network elements; receiving the plurality of signals at the second modem; and sequenced-cell division demultiplexing the plurality of signals to combine the plurality of signals into a single synchronous signal at the second modem, wherein each of the plurality of unbundled network elements includes a G.shdsl link. According to another aspect of the invention, a method comprises transporting digital data including: applying a single signal to a first modem; sequenced-cell division multiplexing the single signal into a plurality of signals at the first modem; and transmitting the plurality of signals from the first modem to a second modem over a plurality of unbundled network elements, wherein each of the unbundled network elements includes a G.shdsl link. According to another aspect of the invention, a method comprises transporting digital data including: receiving a plurality of signals at a modem from a plurality of unbundled network elements; and sequenced-cell division demultiplexing the plurality of signals to combine the plurality of signals into a single synchronous signal at the modem, wherein each of the plurality of unbundled network elements includes a G.shdsl link. According to another aspect of the invention, an apparatus comprises: a DS3 receive circuitry coupled to a data connection; a DPR module coupled to the DS3 receive circuitry; a ROM coupled to the DPR module; and a plurality of G.shdsl transceivers coupled to the DPR module.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
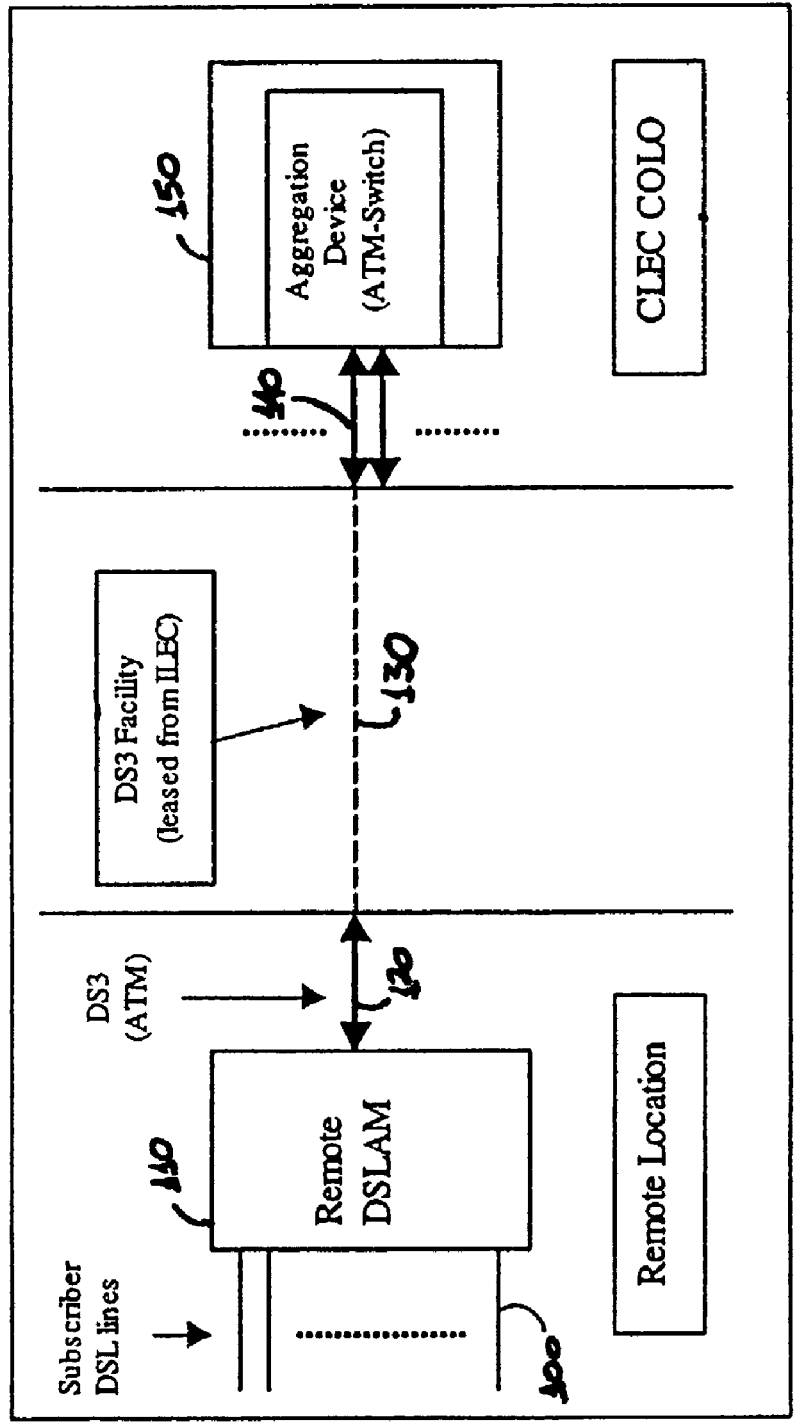
FIG. 1 illustrates a bock diagram of a DS3 backhaul application scenario, appropriately labeled "Prior Art."

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

Full citations for several publications are referenced by Arabic numerals within brackets, and may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. patent applications disclose embodiments that are satisfactory for the purposes for which they are intended. The entire contents of U.S. patent applications: U.S. Ser. No. 60/344,542, filed Nov. 7, 2001; and U.S. Ser. No. 60/358,549, filed Feb. 21, 2002 are both hereby expressly incorporated by reference herein for all purposes.

The context of the invention can include communication networks. The context of the invention can include the transport of digital data over subscriber loops and ATM networks. The context of the invention can also include deploying G.shdsl in DS3 backhaul applications.

The invention can include providing a method and/or apparatus to bond multiple loops (two or more) to obtain an aggregate bit-rate that is, nominally, the sum of the capacities of the individual loops. The method is particularly well-suited for providing backhaul of ATM-formatted cell streams with an aggregate bit-rate of approximately 10 to 15 Mbps ("fractional-DS3").

In addition to traffic which is to be carried over the G.shdsl link that is ATM-formatted DS3, a variety of other forms of traffic can also be addressed. For example, the "local" signal could be presented over an Ethernet link and circuitry provided to convert the Ethernet format to ATM cells. Standards for such an Ethernet to ATM conversion are well known and devices readily commercially available.

In contrast to the high cost of the leased DS3, "Unbundled Network Element" ("UNE") loops can be leased form the ILEC for less, typically much less. The notion of an unbundled network element, in this situation, is that the ILEC provides "dry" copper loops between the CLEC COLO and the remote location. The CLEC is permitted to utilize this copper loop in any desired fashion within the bounds of regulatory constraints. In particular, the CLEC can deploy G.shdsl modems at remote locations and in the COLO. If the distance between the locations is short, less than 6 kft, then each pair can transport 2.3 Mbps and the desired backhaul of 10 to 15 Mbps can be achieved using about 8 UNE-loops (assuming that appropriate equipment is deployed at the two ends). The term UNE-loops used herein is defined as multiple G.shdsl loops. At longer distances a greater number of UNE-loops is required to backhaul the desired bandwidth; equivalently, for a given number of loops, the total data rate supported decreases with distance.

Figure 2:
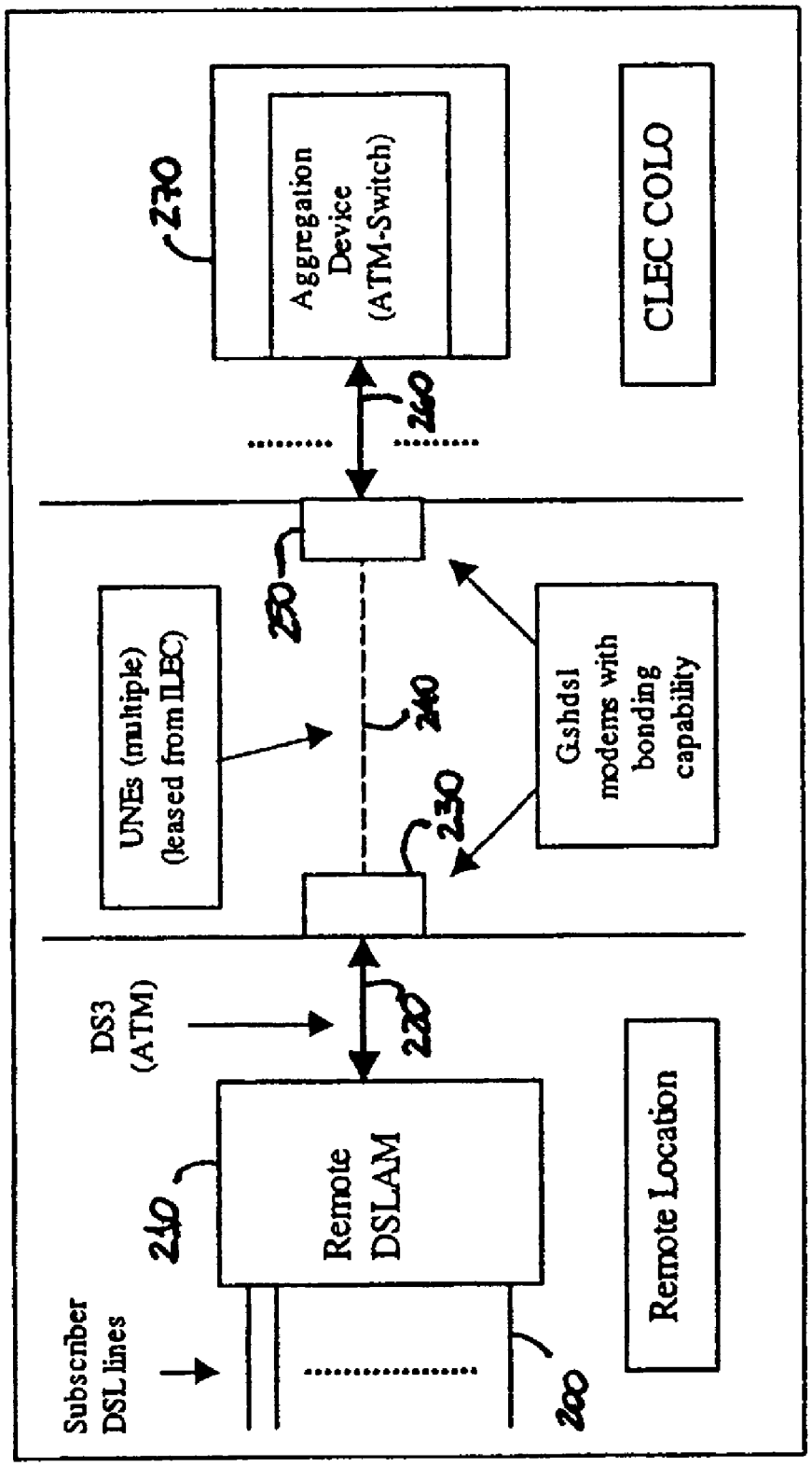
FIG. 2 illustrates a block diagram of a multiple loop bonding application, representing an embodiment of the invention.

Referring to FIG. 2, a block diagram of a multiple loop bonding application is depicted. A plurality of subscriber DSL lines 200 is coupled to a remote DSLAM 210. The remote DSLAM 210 is coupled to a first G.shdsl modem 230 with bonding and/or debonding capability via a DS3 line 220. The first G.shdsl modem 230 is coupled to a plurality of unbundled network elements 240. The plurality of unbundled network elements 240 is coupled to a second G.shdsl modem 250 with bonding and/or debonding capability. The second G.shdsl modem 250 is coupled to a plurality of lines 260. The plurality of lines 260 is coupled to a aggregation device 270 (e.g., an ATM switch).

Clearly, G.shdsl deployed in a multiple loop configuration provides an economic approach for backhaul, provided a method can be developed to "bond" multiple G.shdsl loops in a flexible, scalable, and efficient manner. The invention can include multiple G.shdsl loops ("UNEs") bonded together to provide the requisite channel capacity. To take full advantage of UNE pricing, it is necessary that the CLEC/IXC not require that the ILEC deploy repeaters on the loops between the ILEC CO and the base transceiver station (BTS). Bonding multiple loops can be a most cost effective to obtain the requisite bit-rate.

Figure 3:
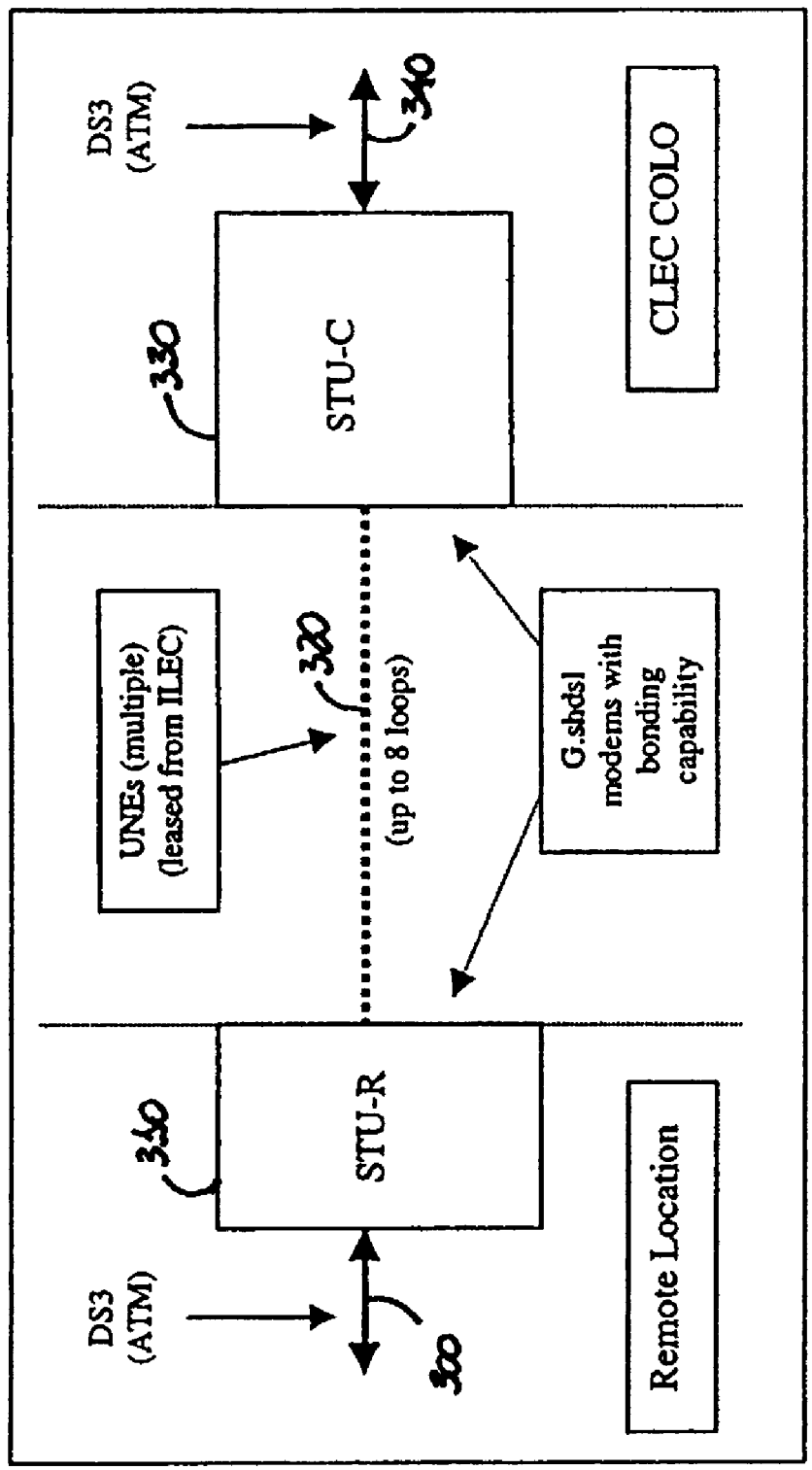
FIG. 3 illustrates a block diagram of a G.shdsl used for fractional-DS3 backhaul application, representing an embodiment of the invention.

Referring to FIG. 3, a block diagram of a G.shdsl used for fractional-DS3 backhaul application is depicted. For clarity of explanation, a specific configuration for the application of fractional-DS3 backhaul is illustrated. A remote location 310 has equipment (such as a DSLAM or a Router) that has roughly 10 to 15 Mbps of ATM-formatted traffic which must be transported over a plurality of unbundled network elements 320 (copper loops) between the remote location 310 and a COLO equipment at a central office site 330. The depicted backhaul configuration can utilize up to 8 copper loops. This 8-loop specificity is for exemplary reasons only; the invention can include to a multitude of other scenarios utilizing more, or fewer, copper loops. The equipment in the remote location 310 is referred to as an "STU-R", and can include a G.shdsl modem with bonding capability. The equipment at the central office site 330 is referred to as "STU-C" (conventional nomenclature) and can include another G.shdsl modem with bonding capability.

G.shdsl can be operated in numerous "modes" defined in the G.shdsl standard. In the "synchronous" (or "framed") mode, the traffic is synchronized from the viewpoint of time-base, to the underlying frame structure used by the G.shdsl transceiver. In the second, or "asynchronous" (or "unframed") mode, the G.shdsl time-base is used to control the traffic data rate. Minor frequency variations between the G.shdsl timebase and the traffic timebase are accounted for using "stuff bits". It will be assumed that in this particular backhaul application, the transceivers operate in the synchronous mode. That is, the STU-C utilizes a time-base provided in the central office (i.e. a network time reference) and synchronizes its G.shdsl transmitter to this reference. All 8 transmitters (it is assumed, in this particular embodiment for specificity, that the STU-R and STU-C utilize up to 8 loops) are frame-synchronized as well as frequency-synchronized. The STU-R recovers time-base from the incoming G.shdsl links for generating its master clock and all 8 transmitters are frame-synchronized as well as frequency-synchronized.

The G.shdsl standard calls out numerous ways of formatting the information bits into the payload. For specificity in this particular embodiment, the following organization of data, and underlying timing issues, is assumed. A block contains overhead bits plus payload bits. The number of payload bits can be given by k, wherein $k=12(i+8n)$. The parameters i and n above are negotiated by the STU-C and STU-R during initialization. In addition to the payload are the overhead bits for the framing and the embedded operations channel (eoc). The duration of a block can be 1.5 msec. In the backhaul application it is assumed that i=0 and thus each block contains 12n octets of payload data corresponding to a payload bit-rate of 64n kbps.

Figure 4:
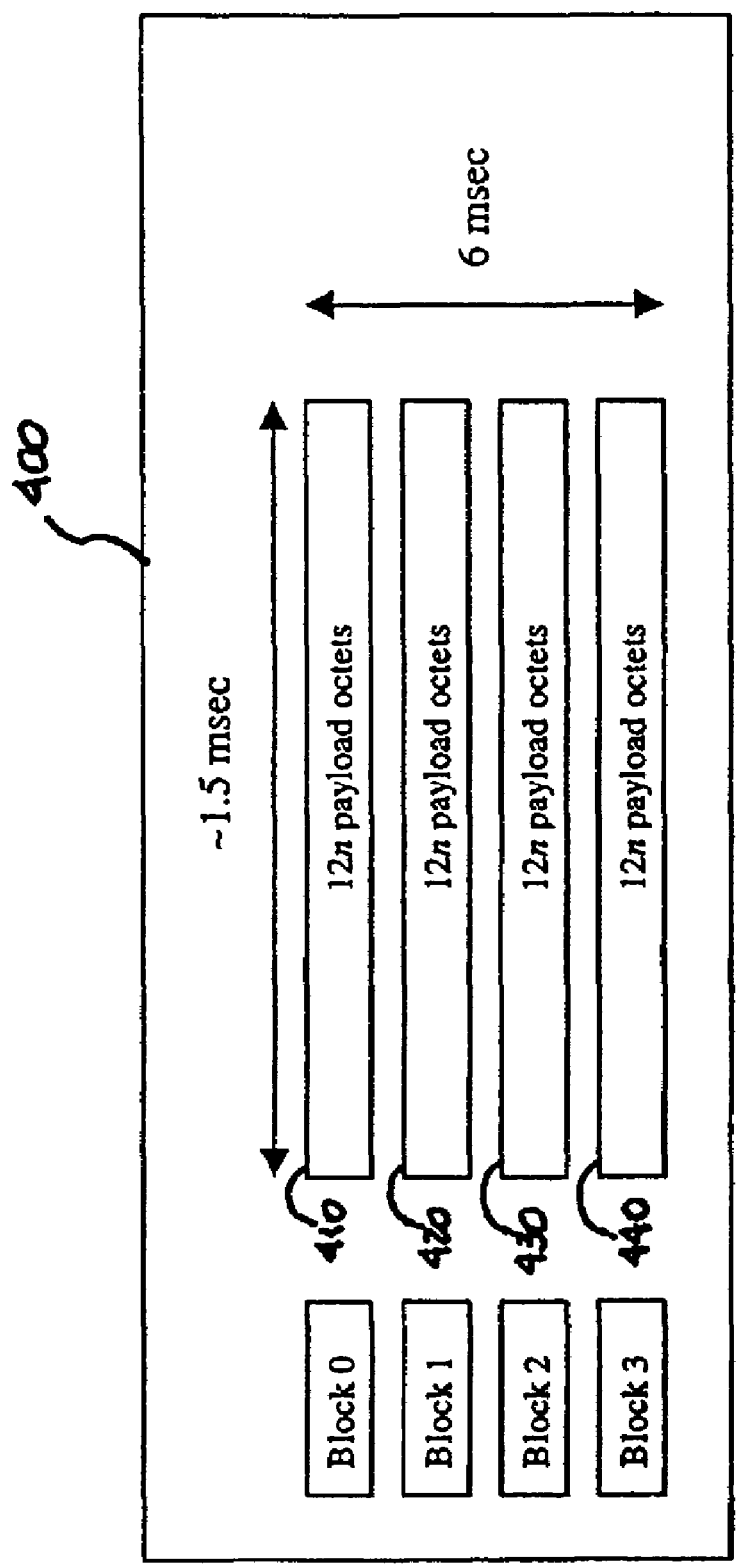
FIG. 4 illustrates a block diagram of G.shdsl payload bits, representing an embodiment of the invention.

Referring to FIG. 4, a block diagram of G.shdsl payload bits 400 is depicted. A frame (or super-block) is of duration 6 msec and is comprised of 4 blocks 410, 420, 430 and 440. From the viewpoint of payload, all blocks are equivalent; from the viewpoint of overhead, each block contains different information. One 14-bit pattern ("Frame Sync Word") is used to identify the start of the frame. Each frame contains 4k payload bits and 48 overhead bits (some vendor specific implementations may have 50 overhead bits). The payload capacity is thus 64n kbps (assuming i=0).

In the case of DS3 backhaul, the DS3 signal is formatted as an ATM cell stream. The specific format merely needs to be satisfied; the method described here is applicable to all forms of mapping ATM cells into a DS3 stream. Even though the DS3 line rate is 44.736 Mbps, the cell-rate is typically equivalent to 30+ Mbps, with the remaining bit-rate consumed by DS3-specific overhead and padding bits. Furthermore, the actual traffic cell rate could be even lower than 30 Mbps, the additional bit-rate consumed by "idle" or "filler" cells. In the backhaul application, it can be assumed that the actual traffic cell rate corresponds to a bit-rate that is less than the aggregate payload rate of the G.shdsl links. Since G.shdsl is limited in payload capacity to roughly 2 Mbps (per link), the traffic cell rate within the DS3 is necessarily limited to about 15 Mbps (the specific numbers will become apparent in the subsequent discussion).

Multiplexing can include subdividing, and demultiplexing can include combining. A multiplexing scheme can include the provision of a "buffer" which will allow the DS3 cell rate to exceed the aggregate G.shdsl capacity over short intervals of time.

Figure 5:
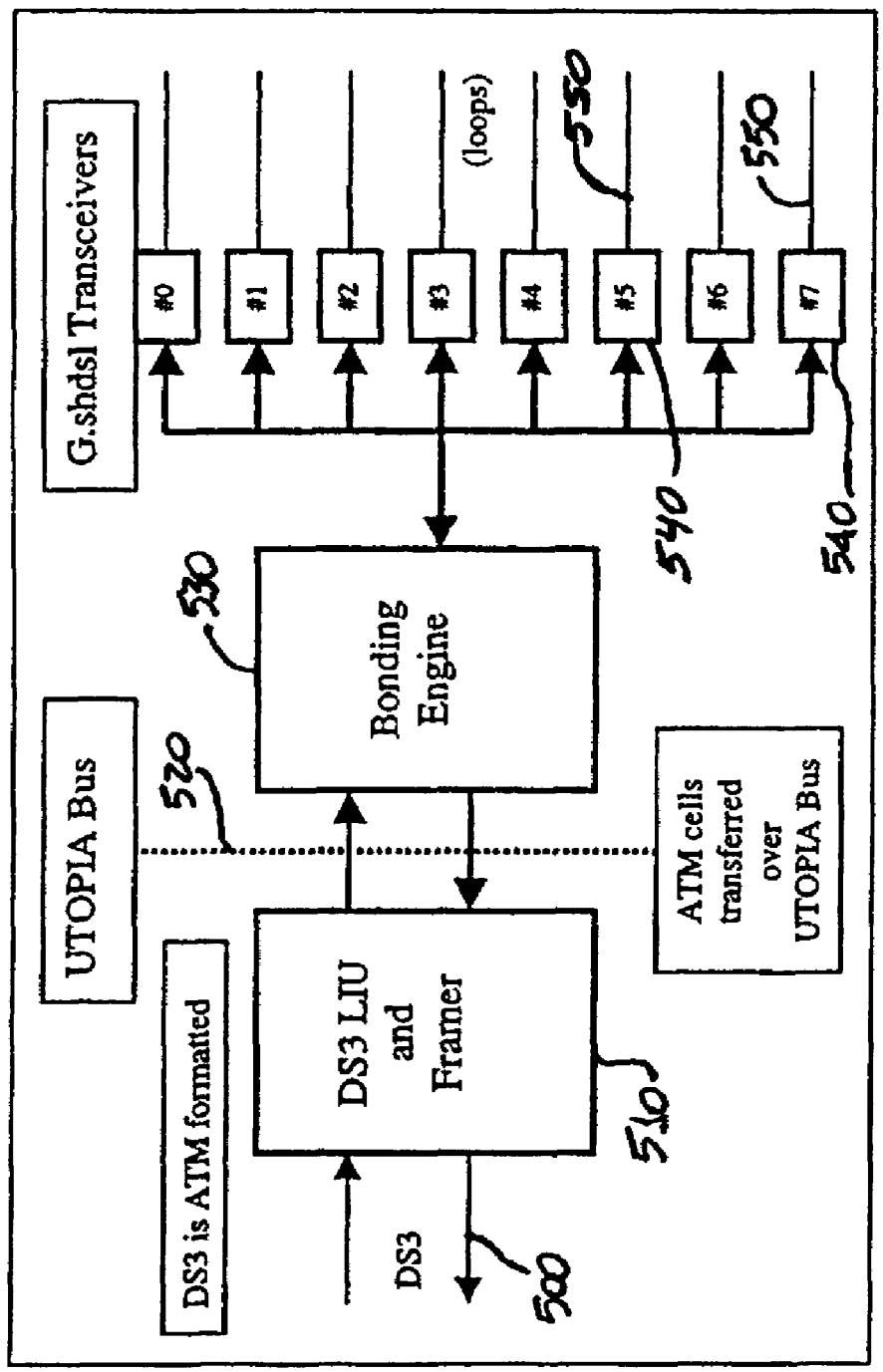
FIG. 5 illustrates a block diagram of an essential structure of STU-R for DS3 backhaul, representing an embodiment of the invention.

Referring to FIG. 5, a block diagram of a structure of STU-R for DS3 backhaul is depicted. A DS3 loop 500 is coupled to a DS3 unit 510. The DS3 unit is coupled to a bonding engine 530 via an UTOPIA bus 520. The bonding engine 530 is coupled to a plurality of G.shdsl transceivers 540. The plurality of G.shdsl transceivers 540 is coupled to a pluralilty of loops 550.

The DS3 interface can be accomplished using readily commercially available circuitry. A DS3-ATM-framer can, for example, be implemented using part-number PM7347 from PMC-Sierra Corp. (also known as S/UNI-JET, Saturn User Network Interface for J2, E3, DS3). For the LIU (Line Interface Unit) a suitable part is 78BP7200L from TDK Corp. These two components can compose the DS3 unit 510. Of importance to the method described is that a standard cell-based interface can be chosen; The interface includes the UTOPIA bus 520. The UTOPIA bus 520 can be a widely adopted standard, such as described in several documents from the ATM Forum. The bonding engine 530 refers to the circuitry that takes cells from the DS3 unit 510 and distributes them over the plurality of G.shdsl transceivers 540 as well as the circuitry that accepts cells from the corresponding G.shdsl receiver subcomponents and sequences these cells for a DS3-transmitter. The plurality of G.shdsl transceivers 540 are readily commercially available from several vendors, for example Globespan Inc., and these readily commercially available chipsets are well documented as to their usage.

Not depicted in FIG. 5 is the circuitry associated with the control function (microprocessor). This is implied and can be implemented in many ways; the design of microprocessor based control circuitry being very well known. Also not shown, but implied, in FIG. 5 is circuitry to generate clock signals. In the central office, the STU-C will be provided with a suitable timing reference signal for generating its clock signals. G.shdsl provides the mechanism for transporting this network timing reference (NTR) to the STU-R. In the remote unit, the STU-R, the network timing reference is extracted from (one of the) G.shdsl links for use as reference to the clock generation circuitry. Circuitry to achieve clock signal generation is readily commercially available and is not elaborated upon here.

It should be reiterated that the technique described here is not limited to DS3 backhaul. Any traffic source (destination) that generates (accepts) ATM cells for transport can be accommodated. In the implementation described herein, it is assumed that the utopia bus architecture is employed to transfer ATM cells between the bonding engine and the traffic source/destination.

For the DS3 Backhaul, the following assumptions shall be made for specificity. Generalization is straightforward.
(i) The backhaul STU-R (the remote end) can have 1 DS3 of traffic on the drop-side and, further, this DS3 can be ATM-formatted. There will be 8 G.shdsl links on the line-side. The STU-C (the central office end) will be configured likewise.
(ii) The intent is to transport as much of the DS3 traffic ATM-cell payload as substantially possible over the 8 G.shdsl links.
(iii) All the G.shdsl links are operated at approximately the same payload rate (a very logical assumption, since the loops have the same end-points).
(iv) The G.shdsl payload rate is determined at start-up and then substantially "fixed".
(v) The system is substantially synchronous. All the G.shdsl links can have the same time-base. Furthermore, the G.shdsl links can be transmitted in a frame-synchronous arrangement (i.e., the G.shdsl frames for all the G.shdsl transmitters are aligned).
(vi) The ATM cells within the DS3, other than idle or filler cells, can be transported intact over the backhaul link and the sequence retained.
(vii) The long term average of the traffic cell-rate can be less than the aggregate capacity of the 8 G.shdsl links. On a short term basis the traffic cell-rate may be higher; some buffering can be provided to avoid cell loss. However, if the traffic cell-rate exceeds the aggregate G.shdsl capacity for an extended period of time, the buffers may overflow and some data lost. No attempt needs to be made to recover lost data.

An ATM cell, as transferred over the UTOPIA bus, can include 53 octets. Of these, 5 octets can compose the header, and 48 octets can compose the protocol data unit (PDU) (another term used is payload data unit). In order to "match" ATM cells with G.shdsl payload capacity, it is useful to consider the notion of an Extended-ATM cell.

Figure 6:
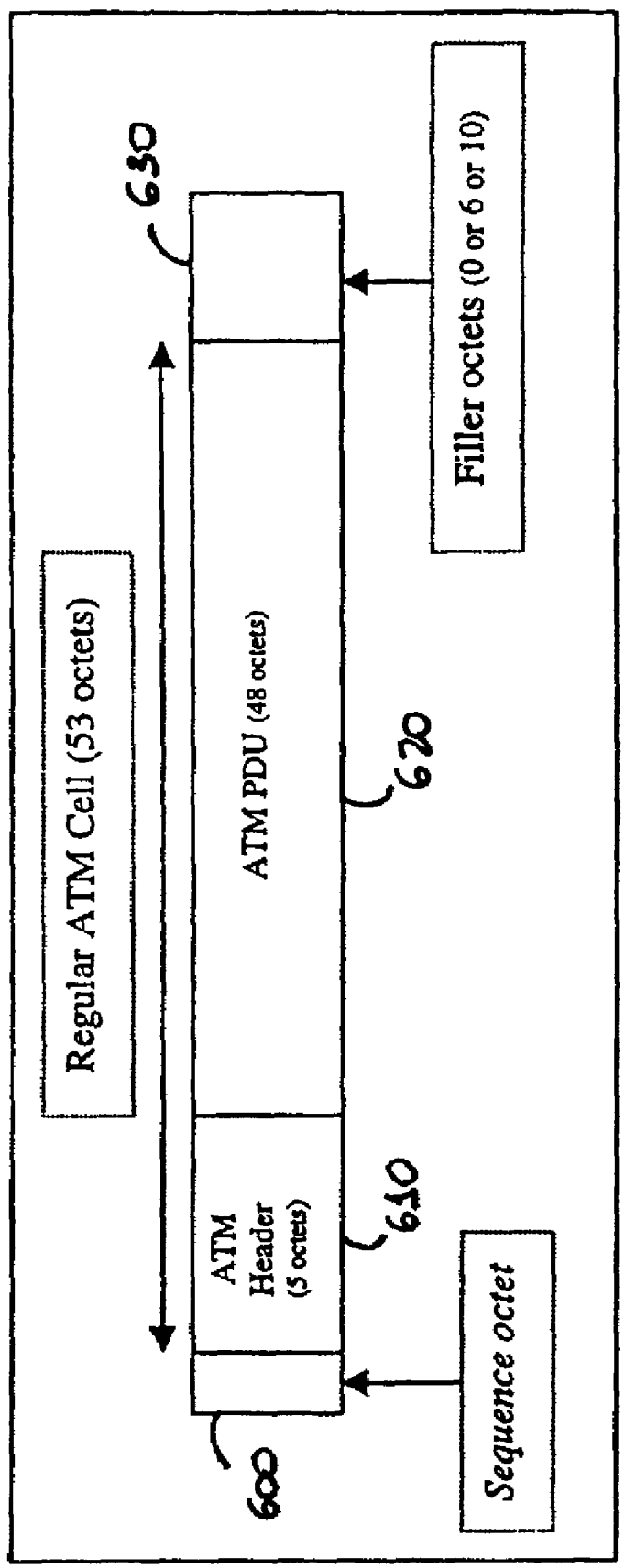
FIG. 6 illustrates a block diagram of the structure of an Extended-ATM cell, representing an embodiment of the invention.

Referring to FIG. 6, a block diagram of a possible structure of an Extended-ATM cell is depicted. Specifically, an Extended-ATM cell includes a regular ATM cell (53 octets) comprising an ATM header 610 and an ATM PDU 620, plus one octet called the sequence octet 600, plus filler octets 630 (additional octets) to make up an assembly of either 54, or 60, or 64 octets. Assemblies of 54 octets are appropriate when the parameter n, which determines the G.shdsl payload configuration (each block contains 12n octets), is a multiple of 9 (i.e., either 9, 18, 27, or 36); assemblies of 60 octets are appropriate when n is a multiple of 5 (i.e., either 5, 10, 15, 20, 25, 30, or 35); assemblies of 64 octets are appropriate when n is a multiple of 16 (i.e., either 16 or 32). This assembly of octets that includes the regular (traffic) ATM cell 610, 620, the sequence octet 600, plus any necessary filler octets 630, is referred to as an Extended-ATM cell.

Figure 7:
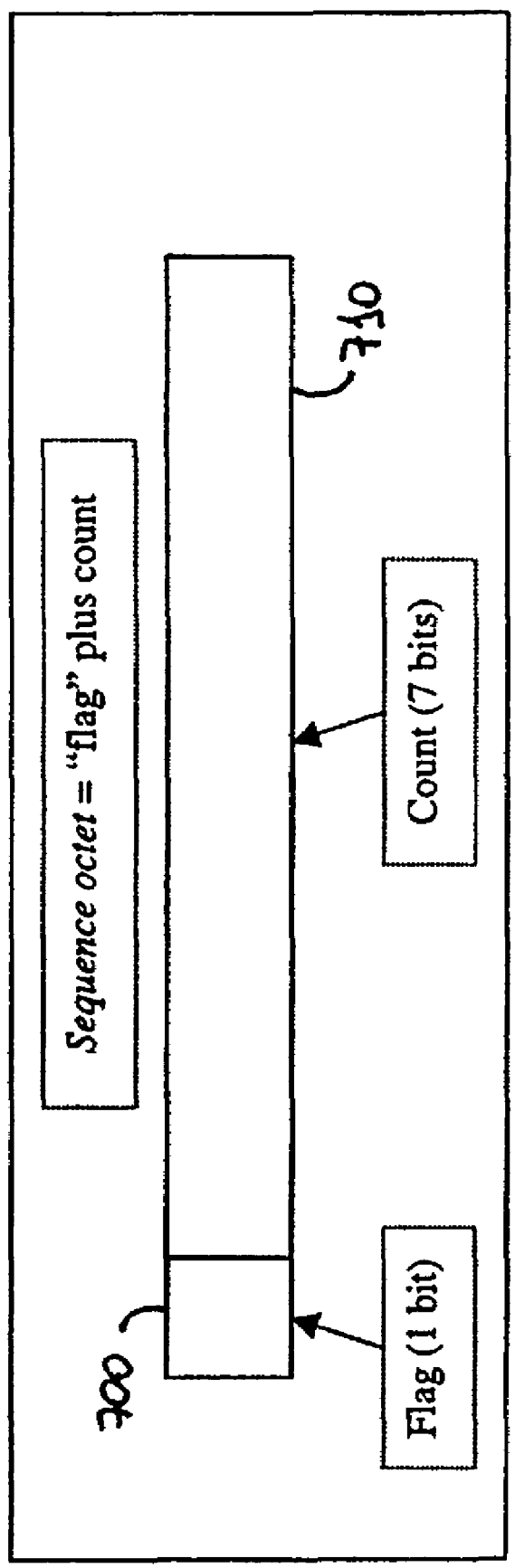
FIG. 7 illustrates a block diagram of a sequence octet, representing an embodiment of the invention.

Referring to FIG. 7, a block diagram of a possible sequence octet is depicted. A sequence octet has two purposes. It is used to provide a sequence number to ATM cells as well as provide a flag 700 to signify whether the Extended-ATM cell is a filler unit or contains an actual traffic ATM cell. The most significant bit can be used as the flag 700; as an example, "0" implies that the Extended-ATM cell contains valid data whereas a "1" implies that the Extended-ATM cell is a filler unit. The remaining 7 bits can include a sequence number 710 that can be assigned to the (valid) ATM cell contained within the Extended-ATM cell. Interpreting the sequence octet as an unsigned binary number, a valid sequence number will be between 0 and 127 (decimal), inclusive; whereas a number between 128 and 255 signifies a filler unit. The flag 700 is a very desirable part of a time-division cell multiplexing (TDCM) scheme; the sequence number 710 is optional and is useful for detecting whether cells were lost (most probably because the cell-rate in the incoming DS3 was too high for the backhaul system to handle and there was a buffer overrun). The term sequenced-cell can be used in place of TDCM.

Figure 8:
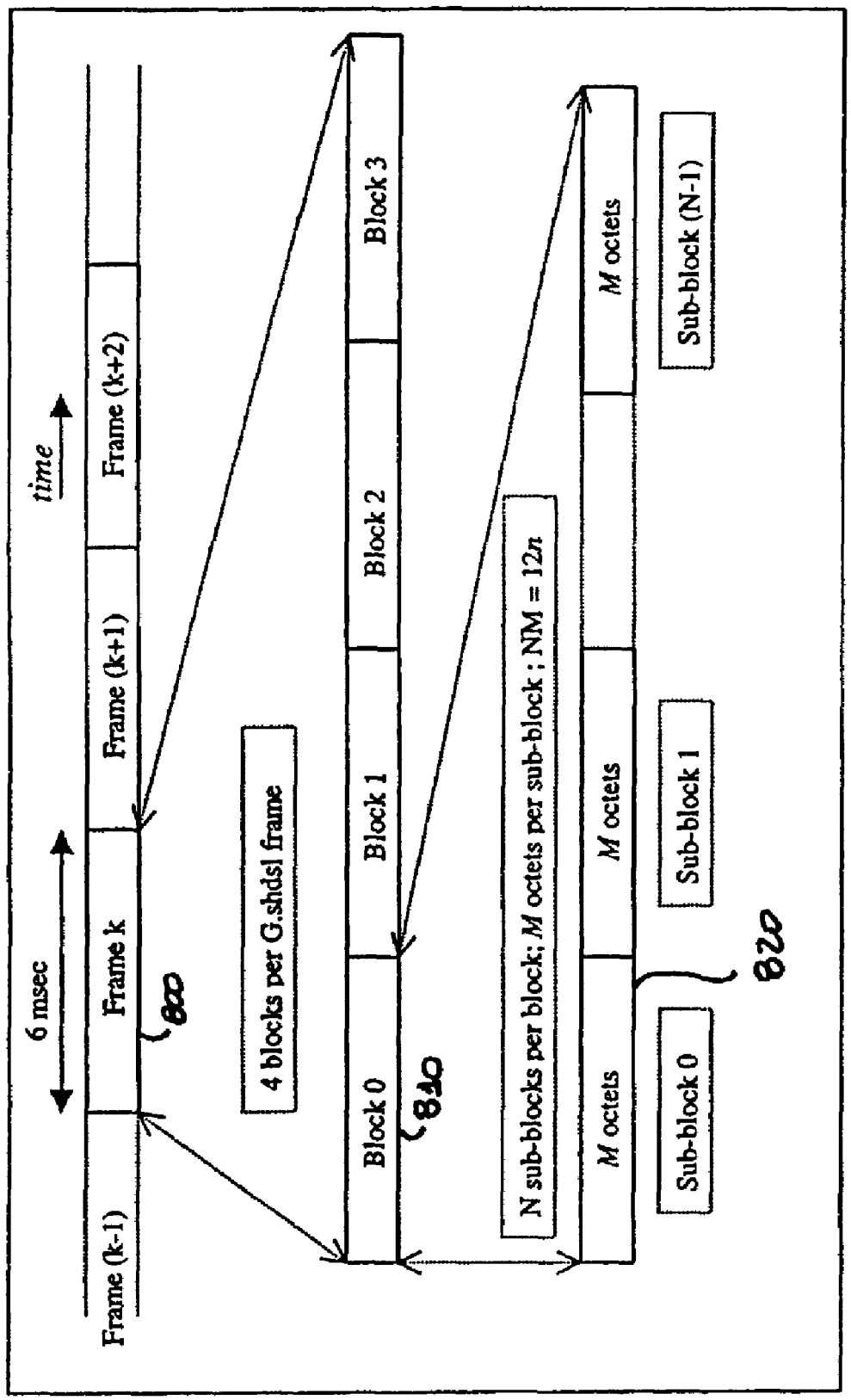
FIG. 8 illustrates a block diagram of a G.shdsl structure, representing an embodiment of the invention.

Referring to FIG. 8, a block diagram of a G.shdsl structure is depicted. The multiplexing scheme is based on the interpretation of the G.shdsl payload as being composed of 6 msec frames; a frame 800 is comprised of 4 blocks (each nominally 1.5 msec); and a block 810 comprised of 12n octets. The block 810 can be sub-divided into N sub-blocks where a sub-block 820 is equivalent to an Extended-ATM cell. The value of N and M depends on the payload capacity of the G.shdsl link, identified as 12n octets per block.

In the above discussion on Extended-ATM cells, the size, M, was stated as being either 54 or 60 or 64, depending on the value of n. These three possibilities shall be referred to as Case I, Case II, and Case III, respectively. Table I (set forth below), illustrates the relationship between n, N, and M. The table also provides the effective payload bit-rate for the G.shdsl link and the maximum cell-rate that can be supported (on a per link basis). The bit-rate is expressed in kbps (kilobits-per-second) whereas the (approximate maximum) cell-rate is expressed in kcps (kilo-cells-per-second or cells-per-millisecond).

TABLE I

Relationship between n, N and M.

| n | N (# of sub-blocks) | M (size of Extended-ATM cell) | Payload bit-rate (per G.shdsl link) | Maximum cell-rate (per G.shdsl link) |
|---|---|---|---|---|
| 9 | 2 | 54 | 576 kbps | 1.33 kcps |
| 18 | 4 | 54 | 1152 kbps | 2.67 kcps |
| 27 | 6 | 54 | 1728 kbps | 4.0 kcps |
| 36 | 8 | 54 | 2304 kbps | 5.33 kcps |
| 5 | 1 | 60 | 320 kbps | 0.67 kcps |
| 10 | 2 | 60 | 640 kbps | 1.33 kcps |
| 15 | 3 | 60 | 960 kbps | 2 kcps |
| 20 | 4 | 60 | 1280 kbps | 2.67 kcps |
| 25 | 5 | 60 | 1600 kbps | 3.33 kcps |
| 30 | 6 | 60 | 1920 kbps | 4.0 kcps |
| 35 | 7 | 60 | 2240 kbps | 4.67 kcps |
| 16 | 3 | 64 | 1024 kbps | 2 kcps |
| 32 | 6 | 64 | 2048 kbps | 4.0 kcps |

Note that because of the different number of padding octets, the deployment preference is Case I over Case II over Case III. For example, n=32 and n=27 both provide the same cell-rate whereas n=27 (Case I) achieves this at a lower payload rate than n=32 (Case III) and thus achieves a higher noise margin (for the same loop length). For comparison purposes, the cell-rate carried over a DS3 is, nominally, 80 kcps [even though the line rate of DS3 is 44.736 Mbps, the format used to pack cells into the DS3 payload restricts the bit-rate used for traffic to about 36 Mbps which translates, very roughly, to 80 kcps].

The actual cell-rate that can be transported across a G.shdsl link is dependent on the payload capacity that in turn depends on the length of the subscriber (copper) loop used and the level of cross-talk present.

Table II (set forth below), illustrates the payload capacity of G.shdsl as a function of loop length. In particular, for a given value of n, the approximate maximum loop length is provided. Since the performance depends on length as well as cross-talk, and the latter is difficult to establish in an absolute manner, one column of Table II provides the length based on high levels of cross-talk (or noise) and another column for the case where cross-talk (or noise) is minimal or absent. The former is taken from the G.shdsl standard and can be considered conservative (or pessimistic) whereas the latter is extracted from chip vendor documentation and should be considered optimistic. The data shown are estimated values obtained by extrapolating data provided in the G.shdsl Standard and by chip vendors and should be considered very approximate.

TABLE II

Payload capacity of G.shdsl as a function of loop length.

| n | Payload rate (kbps) | Maximum cell-rate (kcps) | Max. loop length (26 AWG) no-noise | Max. loop length (26 AWG) high-noise |
|---|---|---|---|---|
| 5 | 320 | 0.67 | 20 kft | 19 kft |
| 9 | 576 | 1.33 | 18 kft | 13 kft |
| 15 | 960 | 2.0 | 16 kft | 10 kft |
| 18 | 1152 | 2.67 | 15.5 kft | 9 kft |
| 25 | 1600 | 3.33 | 14.0 kft | 8 kft |
| 27 | 1728 | 4.0 | 13 kft | 7 kft |
| 35 | 2240 | 4.67 | 12.5 kft | 6.4 kft |
| 36 | 2304 | 5.33 | 12 kft | 6 kft |

Table III (set forth below), illustrates the data-distance profile of G.shdsl links. It provides the payload supported as a function of loop length in both no-noise and high-noise environments. The capacity is viewed in terms of maximum cell-rate as well as corresponding bit-rate. From Table II it can be seen that if the loop length is much greater than 20 kft of 26 AWG cable, then the capacity is small. At the other extreme, if the loop length is less than about 12 kft, 5.33 kcps can be transported over a single G.shdsl link (in a low-noise environment) and this is roughly the maximum cell-rate supportable by a single G.shdsl link. Operating at a payload rate less than the maximum implies the ability to accommodate additional signal-to-noise ratio margin.

TABLE III

Data-distance profile of G.shdsl links

| Loop Length (kft; 26 AWG) | Low-Noise/No-Noise Payload; cell-rate | | High-Noise Payload; cell-rate | |
|---|---|---|---|---|
| < ~20 kft | 320 kbps; | 0.67 kcps | 320 kbps; | 0.67 kcps |
| < ~18 kft | 576 kbps; | 1.33 kcps | 320 kbps; | 0.67 kcps |
| < ~16 kft | 960 kbps; | 2.0 kcps | 320 kbps; | 0.67 kcps |
| < ~15 kft | 1152 kbps; | 2.67 kcps | 320 kbps; | 0.67 kcps |
| < ~14 kft | 1600 kbps; | 3.33 kcps | 320 kbps; | 0.67 kcps |
| < ~13 kft | 1728 kbps; | 4.0 kcps | 576 kbps; | 1.33 kcps |
| < ~12 kft | 2240 kbps; | 4.67 kcps | 576 kbps; | 1.33 kcps |
| < ~10 kft | 2304 kbps; | 5.33 kcps | 960 kbps; | 2.0 kcps |
| < ~9 kft | 2304 kbps, | 5.33 kcps | 1152 kbps; | 2.67 kcps |
| < ~8 kft | 2304 kbps, | 5.33 kcps | 1600 kbps, | 3.33 kcps |
| < ~7 kft | 2304 kbps, | 5.33 kcps | 1728 kbps, | 4.0 kcps |
| < ~6 kft | 2304 kbps, | 5.33 kcps | 2304 kbps, | 5.33 kcps |

A multiplexing scheme can be based on the observation that each G.shdsl sub-block corresponds to one Extended-ATM cell. That is, the ATM cells contained in the DS3 signal are mapped into the G.shdsl sub-blocks. The ATM cell stream contained in the DS3 is "bursty" whereas the octets transmitted over the G.shdsl link are done in a "smooth" manner. The sequence octet provides the mechanism whereby octets (actually equivalent to Extended-ATM cells) sent out over the G.shdsl link can be identified as being "data" or "filler" and thereby either utilized or discarded at the other end of the link.

The invention can include a methodology for implementing the multiplexing scheme and takes into account the fact that the ATM cell stream received in the DS3 can not only be bursty, but have brief intervals where the cell-rate exceeds the nominal aggregate capacity of the G.shdsl backhaul links. The invention can also include a methodology for implementing the Time-Division-Cell-Multiplexing scheme described above. The description set forth herein is kept quite general to allow for flexibility in actual circuit design and development.

Dual-port RAMs (DPRs) are a versatile tool in digital circuit design and their use is well understood. Many field programmable gate arrays (FPGAs), such as those marketed by Xilinx Corporation, have built-in macros for designing in DPRs of various form-factors and capacity. The implementation described uses DPR elements to transfer ATM cells (encapsulated in Extended-ATM cells) from the DS3 side to the G.shdsl side in an effective manner. For specificity, the transfer of data in the DS3-to-G.shdsl direction shall be described in greater detail. The scheme for the other direction of data transfer can be implemented correspondly.

One DPR module can be associated with each G.shdsl transmitter. The G.shdsl transmitter "reads" the outgoing data octets from the DPR module. At a minimum, it suffices that the DPR modules have storage capacity equivalent to two sub-blocks. In this minimalist case the G.shdsl transmitters are reading from one sub-block while the data from the DS3 is being written into the other sub-block. However, for timing simplicity, and to provide a reasonable size buffer, and minimizing logic complexity, it is advantageous to make the DPR modules equivalent in size (capacity) to the number of sub-blocks in one G.shdsl frame (or an integer multiple of G.shdsl frames, if a large buffer is desired).

Hence it can be assumed that the DPR (module) capacity is 32 Extended-ATM cells (or sub-blocks) to accommodate the case where n=36; for convenience in generating addresses, an Extended-ATM cell to reside in 64 octets of memory (in certain cases there may be "unused" capacity) is considered. The G.shdsl-transmitter-read operations can be viewed as a sequential access from the DPR module operated as a circular buffer (i.e. with address wrap-around). Since the 8 G.shdsl transmitters are frame-synchronized, all eight are reading out octets from the same sub-block and consequently a single address generation circuit module can be used for all eight DPR modules (on the G.shdsl side of the DPRs). By organizing the write operations (the DS3 ATM cell-data is written into the DPR modules) to occur in a different sub-block from where the G.shdsl read operations are occurring, address contention in the DPR is avoided. That is, this organization of memory into sub-blocks is appropriate for ensuring that a write operation and a read operation do not access the same memory location.

Figure 9:
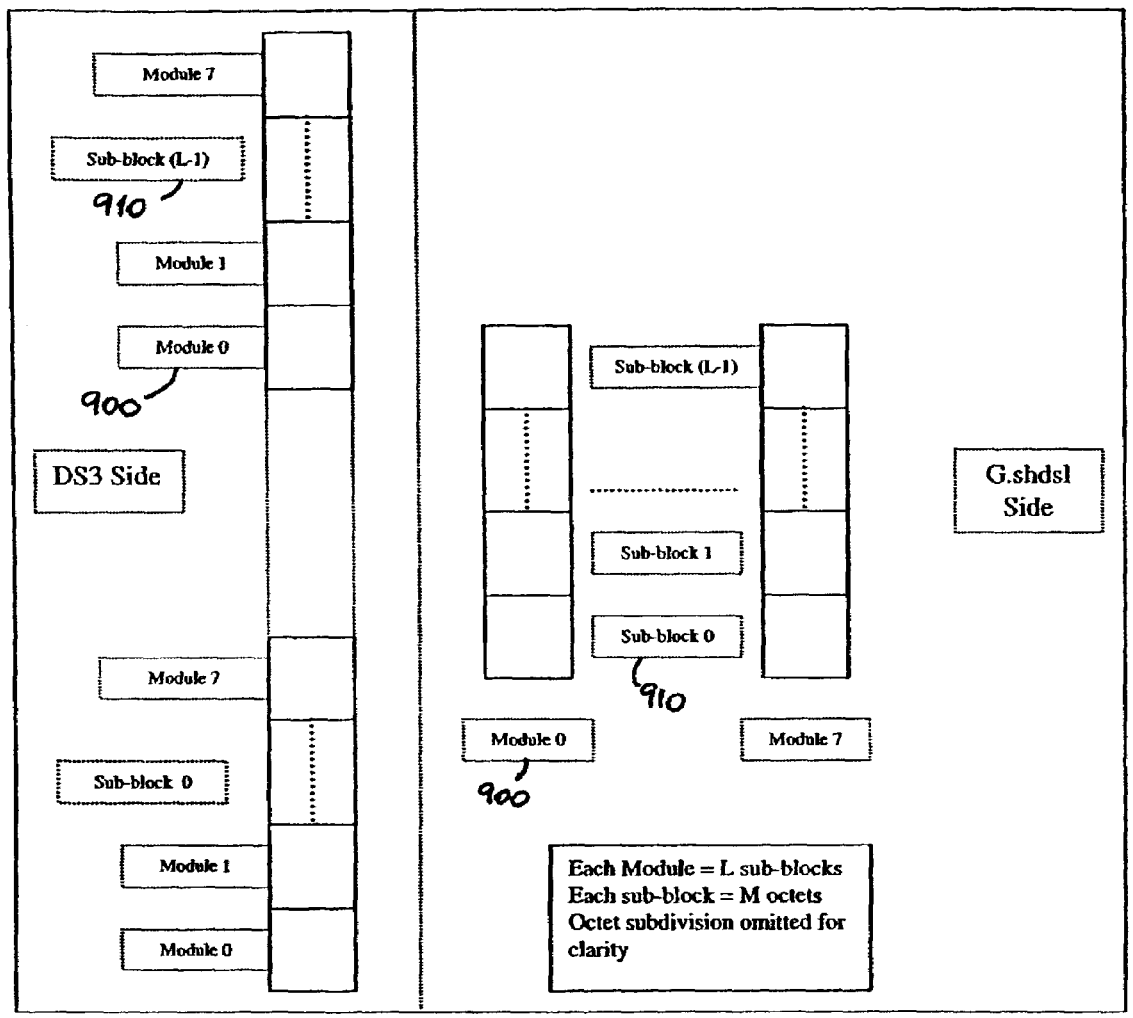
FIG. 9 illustrates a block diagram of an organization of overall DPR (dual-port RAM) memory, representing an embodiment of the invention.

Referring to FIG. 9, a block diagram of an organization of overall DPR (dual-port RAM) memory is depicted. From the DS3 side the memory array appears as a single array. The address for this single array can be segmented as (sub-block) (module) (octet)

Still referring to FIG. 9, a module segment 900 includes 3 bits corresponding to values between 0 and 7 (there is one module per G.shdsl transceiver and it is assumed there are 8 G.shdsl transceivers). A sub-block segment 910 includes 5 bits allowing for 32 sub-blocks (if the DPR module capacity is increased from 1 G.shdsl frame to 2 G.shdsl frames, then 6 bits are needed to allow for 64 sub-blocks; i.e., the sub-block segment word-length is an implementation parameter). The range of values for the sub-block 910 segment is 0 through (L−1) where L is equal to the number of sub-blocks considered and will be 32 if the DPR module is set up for 1 G.shdsl frame. The specific value of L depends on n, the parameter that determines the G.shdsl payload capacity. For 1 G.shdsl frame's worth of memory, L=4N (see Table 2.1). The octet segment of the address is 6 bits allowing for the M 64 octets of an Extended-ATM frame. For Cases I, II, and III, M is 54, 60, and 64 octets respectively. The range of values of the octet segment is 0 through (M−1).

From the G.shdsl side the memory array appears as 8 "separate" modules since the 8 G.shdsl transceivers access memory in unison and the synchronous mode of operation permits the use of identical addresses. From an implementation viewpoint, even though the G.shdsl transceivers are referred to as accessing the memory "in unison", 8 separate accesses will be performed in the time allocated for one octet and the 8 accesses will cycle through modules 0 through 7 (at high speed) achieving the effect of all 8 transceivers accessing the same address within each module "simultaneously". The address within each module can be segmented as (sub-block)(octet)

The ranges of the segments are the same as for the corresponding entities on the DS3 side. In FIG. 9, the detail of the octet level breakdown of the sub-blocks 910 has been omitted for sake of clarity.

Sequential access, from the viewpoint of the G.shdsl side, involves incrementing the octet address through the range 0 through (M−1) in each sub-block starting from sub-block#0, then sub-block#1, . . . , sub-block#(L−1), and then back to sub-block#0. The 8 G.shdsl transceivers access the 8 DPR modules "simultaneously" (by doing 8 accesses in round-robin fashion over module addresses 0 through 7). Viewing the address as a pair (sub-block,octet), the sequence of addresses can be written as $(0,0),(0,1), \ldots , (0,(M-1))$, $(1,0), \ldots , (1,(M-1)),(2,0), \ldots$ , and so on. That is, the octet address counts and rolls-over after (M−1) and the sub-block count increments (modulo-L) with each octet count rollover. This can also be expressed mathematically as $\{\{(l,m); m=0, 1, 2, \ldots , (M-1)\}; l=0, 1, 2, \ldots , (L-1)\}$, where the expression depicts the operation of one pass through the memory array, sequentially accessing each octet.

Sequential access, from the viewpoint of the DS3 side, involves incrementing the octet address through the range 0 through (M−1) in [sub-block#0,module#0]; then through the same range in [sub-block#0,module#1]; and so on through [sub-block#0,module#7]. The next "higher" addresses are octets 0 through (M−1) in [sub-block#1,module#0], . . . , [sub-block#1,module#7]; and so on. Viewing the address as a triplet (sub-block,module,octet), the sequence of addresses can be written as: $(0,0,0),(0,0,1), \ldots , (0,0,(M-1))$, $(0,1,0), \ldots , (0,1,(M-1)), (0,2,0), \ldots , (0,2,(M-1)), \ldots$, $(0,7,(M-1)),(1,0,0), \ldots , (1,0,(M-1)),(1,1,0), \ldots , (1,7,(M-1)), \ldots , ((L-1),7,(M-1))$.

Stated differently, the octet address counts modulo-M and when it rolls-over the module count increments modulo-7. The sub-block count increments modulo-L when both octet and module counts roll-over. This can be expressed mathematically as $\{\{\{(l,k,m); m=0, 1, 2, \ldots , (M-1)\}; k=0, 1, \ldots , 7\}; l=0, 1, 2, \ldots , (L-1)\}$, where the expression depicts the operation of one pass through the memory array, sequentially accessing each octet.

Figure 10:
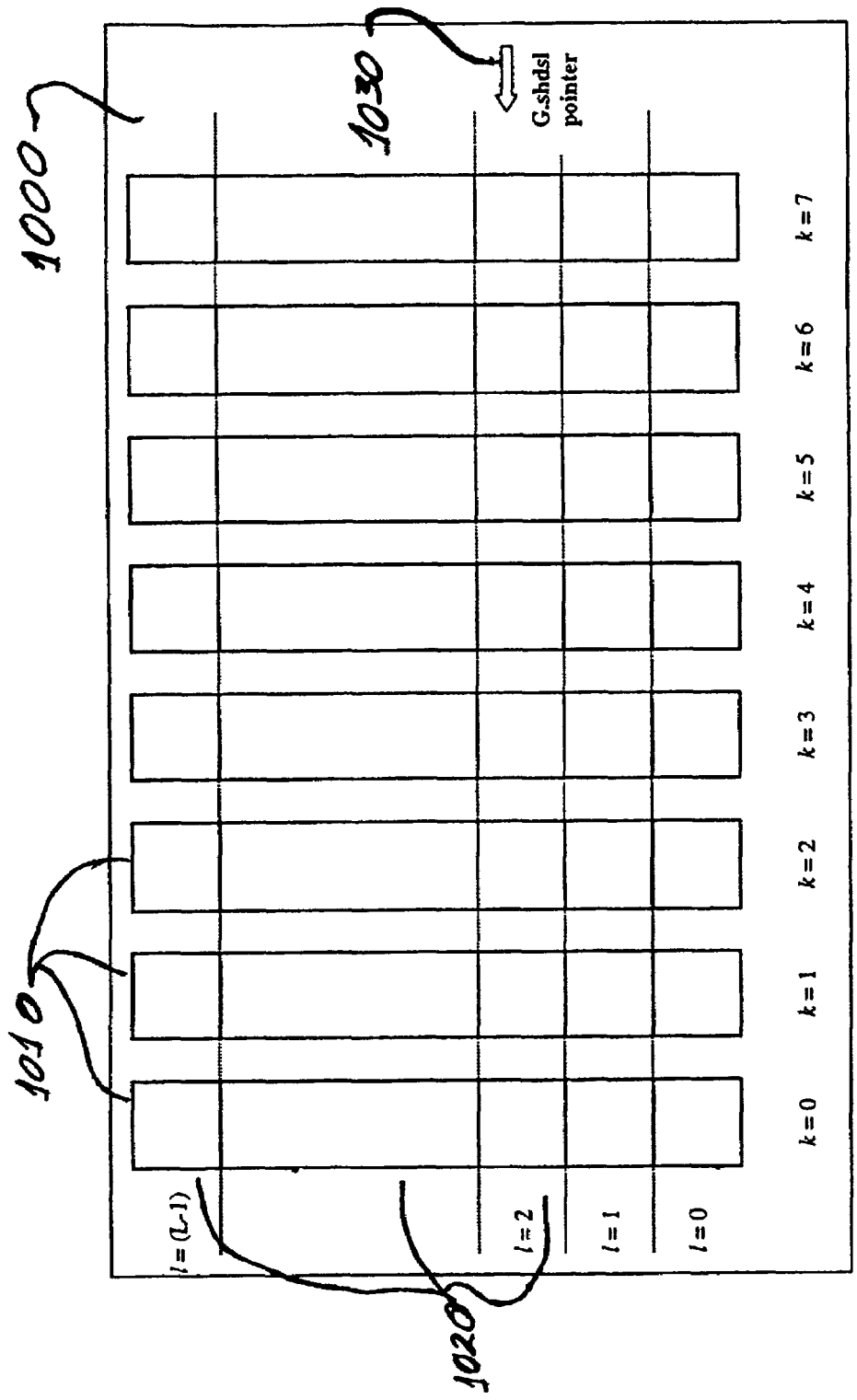
FIG. 10 illustrates a block diagram of a memory array visualized as layered tubes, representing an embodiment of the invention.

Referring to FIG. 10, a block diagram of a memory array 1000 visualized as layered tubes is depicted. It is convenient to visualize the memory array as "layered tubes", where each "tube" is a module 1010 associated with a G.shdsl transceiver; each "layer" is a sub-block 1020 or Extended-ATM cell.

Still referring to FIG. 10, the G.shdsl access to the memory array is sequential. A G.shdsl pointer 1030 represents the address of the memory, in terms of (l,,m) where l represents the sub-block 1020 or Extended-ATM cell (or "layer"), m represents the octet location within the sub-block 1020, and the intention of the notation "„" is that all 8 "tubes" are accessed simultaneously.

Figure 11:
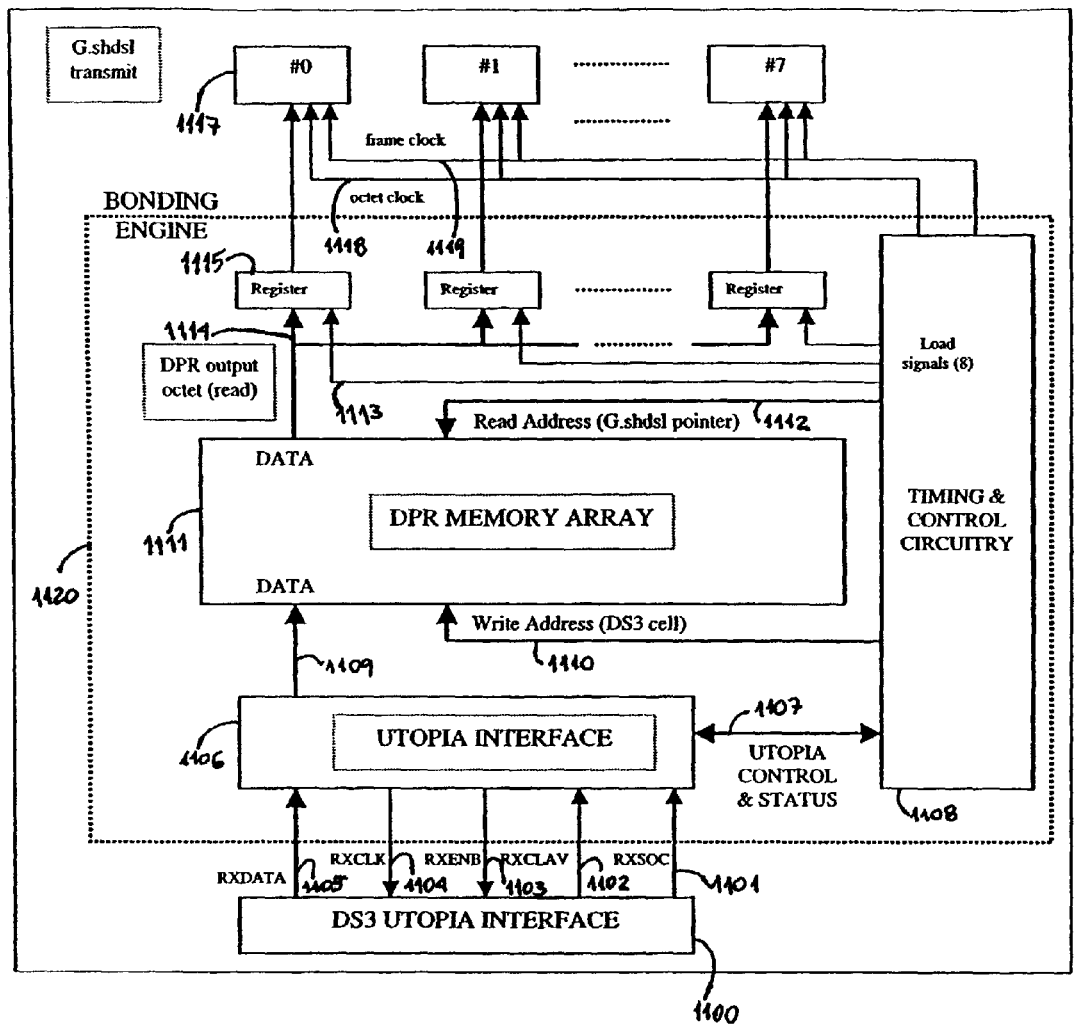
FIG. 11 illustrates a block diagram of a bonding engine circuit operating in a DS3-to-G.shdsl direction, representing an embodiment of the invention.

Referring to FIG. 11, a block diagram of a bonding engine circuit 1120 operating in a DS3-to-G.shdsl direction is depicted. A DS3 utopia interface 1100 is coupled to a bonding engine utopia interface 1106 via an RXSOC line 1101, an RXCLAV line 1102, an RXENB line 1103, an RXCLK line 1104 and an RXDATA line 1105. The bonding engine utopia interface 1106 is coupled to a DPR memory array 1111 via a data line 1109. The interface 1106 is coupled to a timing and control circuitry 1108 via an utopia control and status line 1107. The timing and control circuitry 1108 is coupled to the DPR memory array 1111 via a write address line 1110, and via a read address line 1112.

Still referring to FIG. 11, the DPR memory array 1111 is coupled to a register 1115 via a DPR output octet line 1114. The timing and control circuitry is coupled to the register 1115 via a load signal line 1113. The register 1115 is coupled to a G.shdsl transmitter 1117. The timing and controlling circuitry 1108 is coupled to the G.shdsl transmitter 1117 via an octet clock line 1118, and via a frame clock line 1119.

Still referring to FIG. 11, this exemplary embodiment can comprise eight registers and eight respective G.shdsl transmitters. In the DS3-to-G.shdsl direction cells from the DS3 interface are accepted over the Utopia Bus and written into memory. The G.shdsl transmitter 1117 reads octets from memory for delivery over the G.shdsl link. As mentioned before, the G.shdsl read operation is treated as though all 8 transmitters were reading octets out simultaneously. The G.shdsl read pointer thus identifies the layer (sub-block or Extended-ATM cell) from which octets are being read out. To avoid memory access contention, it suffices that the DS3-write operation be constrained such that the G.shdsl-read-layer is avoided.

Still referring to FIG. 11, though not necessary, it is helpful to make the "read" operation a "read-modify-write" operation. The octet from the DPR memory array 1111 is read out and passed to the G.shdsl transmitter 1117. In the same location a fixed pattern, preferably all-1s (octet=11111111 in binary), is written back. An alternative is to write the all-1s octet into the sequence octet after the Extended-ATM cell has been read out of the DPR memory array 1111.

Still referring to FIG. 11, the DS3 receive circuitry is represented by the DS3 utopia interface 1100, emphasizing that the transfer mechanism uses the Utopia Bus architecture (details of the receive circuitry are omitted for simplicity), and also emphasizing that any source/destination is possible, not just DS3. Similarly, for simplicity only the key interface signals of the G.shdsl transmitter 1117 are shown.

Still referring to FIG. 11, the bonding engine 1120 will be, in Utopia parlance, the "ATM layer" or master of the Utopia bus. For this application Utopia-Level-1 architecture suffices. The bonding engine 1120 provides the requisite control signals. The RXCLK line 1104 is a clock signal for timing data transfer. The RXDATA line 1105 is the octet-wide data bus for delivering octets from the DS3 utopia interface 1100 to the bonding engine 1120; the RXENB line 1104 is an enable signal. The DS3 utopia interface 1100 provides the appropriate status signals. The RXCLAV line 1103 is a signal indicating that a cell is available (or not). The RXSOC line 1101 is a signal to indicate "start-of-cell" and is asserted when the octet being transferred is the first octet of a 53-octet (regular) ATM cell. The bonding engine utopia interface 1106 in the bonding engine 1120 performs the function of incrementing the sequence number for the sequence octet, writes 54 octets into the DPR memory array 1111 for each ATM cell, and provides the requisite control signals to the DS3 utopia interface 1106.

Still referring to FIG. 11, data read out of the DPR memory array 1111 destined for the G.shdsl transmitter 1117 is stored temporarily in the register 1115 and then simultaneously transferred to the G.shdsl transmitter 1117 using the octet clock line 1118 signal. The G.shdsl transmitter 1117 is forced to operate in a frame-synchronous manner by providing the frame clock line 1119 signal. Within each octet clock period, 8 separate read operations are performed using the same (sub-block)(octet) address but with (module) ranging from 0 through 7. The results are stored in the register 1115 using individual "load" control signals. This arrangement, in effect, allows us to consider the read operation for the G.shdsl transmitter 1117 as "simultaneous". In this particular arrangement, the invention comprises eight registers and eight G.shdsl transmitters.

Still referring to FIG. 11, in the read operation, octets from the DPR memory array 1111 are transferred to the G.shdsl transmitter 1117 continuously and the memory sequencing is sequential. The write operation is "bursty", considering that a write operation is done only if a cell is available from the DS3 interface. Furthermore, the arrival rate of ATM cells in the DS3 stream may, on a short term basis, be higher than the aggregate rate at which cells are read out.

Still referring to FIG. 11, whereas the writing of cells into the DPR memory array 1111 is nominally sequential, the need to prevent memory contention (the two sides accessing the same memory location), avoids disruption of a nominal pattern. This mode of memory access can be referred to as "almost-sequential". Visualizing the array as layered tubes, sequential access would imply that the write operation deposits cells in all tubes of a layer before proceeding to the next layer. The notion of "almost-sequential" is that the layer may be bumped, even if all 8 tubes have not been accessed, implying that the layer is "incomplete". The sequence octet mechanism is capable of distinguishing (at the far end) when G.shdsl octets originated from an incomplete write operation.

Still referring to FIG. 11, the method of operation and the implicit description of the circuitry required in the timing and control circuitry 1108 is described below in an algorithmic format. It is assumed that when a cell is written, it is written in its entirety (53 ATM cell octets plus sequence octet). Consequently, in the discussion of control flow below, one needs to consider only the location of sub-blocks (Extended-ATM cells) in the DPR memory array 1111 and this is expressed by the pair (l,k) corresponding to (sub-block)(module).

It can be advantageous to denote the last cell-address used to write (by the DS3 side) into the DPR memory array 1111 by $(l_D, k_D)$. The next cell address, if sequential, would be obtained by incrementing $k_D$ modulo-8 and if there was a roll-over, incrementing $l_D$ modulo-L. Denote this next (potential) cell-address by $(\lambda_D, \kappa_D)$. The G.shdsl pointer is in some layer (sub-block). Denote this layer by $l_G$. The algorithm follows.

Step 0: Compute $(\lambda_D, \kappa_D)$.

Step 1: Check if there is a potential conflict. Is $\lambda_D = l_G$? If YES, go to step 1A; if NO, go to step 1B.

Step 1A $\{(\lambda_D = l_G?) = YES\}$: This implies that the next DS3-cell, if written in the "normal sequential" manner, may have a memory contention with the G.shdsl read operation. Two possibilities arise. First is that the DS3-write is entering the layer where the G.shdsl read is occurring (DS3 chasing the G.shdsl and catching up); second is that the DS3-write has not completed the layer but the G.shdsl read is entering it (G.shdsl chasing the DS3 and catching up). The two possibilities can be distinguished by checking $\kappa_D$. Is $\kappa_D=0$? If YES, go to step 1AA; if NO, go to step 1AB.

Step 1AA {($\kappa_D=0$?)=YES}: (DS3 catching up with G.shdsl). The action is to "WAIT". That is, keep ($l_D,k_D$) unchanged and go to step 0.

Step 1AB {($\kappa_D=0$?)=NO}: (G.shdsl has caught up with DS3). The action is to bump the DS3 layer to one above where the G.shdsl read is occurring. Set $\lambda_D=l_G+1$ (modulo-L); set $\kappa_D=0$. Go to step 2.

Step 1B {($\lambda_D=l_G$?)=NO}: This implies that the next DS3-cell, if written in the "normal sequential" manner, will not have a memory contention with the G.shdsl read operation. Go to step 2.

Step 2: Check if a cell is available from the UTOPIA (DS3) interface. If YES go to step 2A; if NO then go to step 2B.

Step 2A {there is a cell available}: Compute the sequence octet and write the Extended-ATM cell into the cell address determined by ($\lambda_D$, $\kappa_D$). Then set ($l_D,k_D$)= ($\lambda_D$, $\kappa_D$) and go to step 0.

Step 2B {cell unavailable}: The action is to "WAIT". That is, keep ($l_D,k_D$) unchanged and go to step 0.

The impact of this algorithm is that the DS3-write is always "ahead" of the G.shdsl-read.

Still referring to FIG. 11, this exemplary embodiment can comprise eight registers and eight respective G.shdsl transmitters. The DS3 line rate of 44.736 Mbps can sustain a cell-rate corresponding to 30+ Mbps, much greater than the aggregate payload capacity of the G.shdsl links. In practice, the sustained long term average cell rate is limited by the backhaul link(s). On a short-term basis, the bonding engine can accept cells at a higher rate. In this situation, cells are being written into the DPR memory array 1111 faster than they are being read out and the size of the DPR memory array 1111 determines how low long this condition can persist without loss of data. In this discussion the notion of making the DPR memory array size 1111 equivalent to 8L sub-blocks has been used, where L was the number of Extended-ATM cells carried in one G.shdsl frame. The buffer size can be increased from 8L to 16L (2 G.shdsl frames) or even more, depending on the availability of memory capacity.

Figure 12:
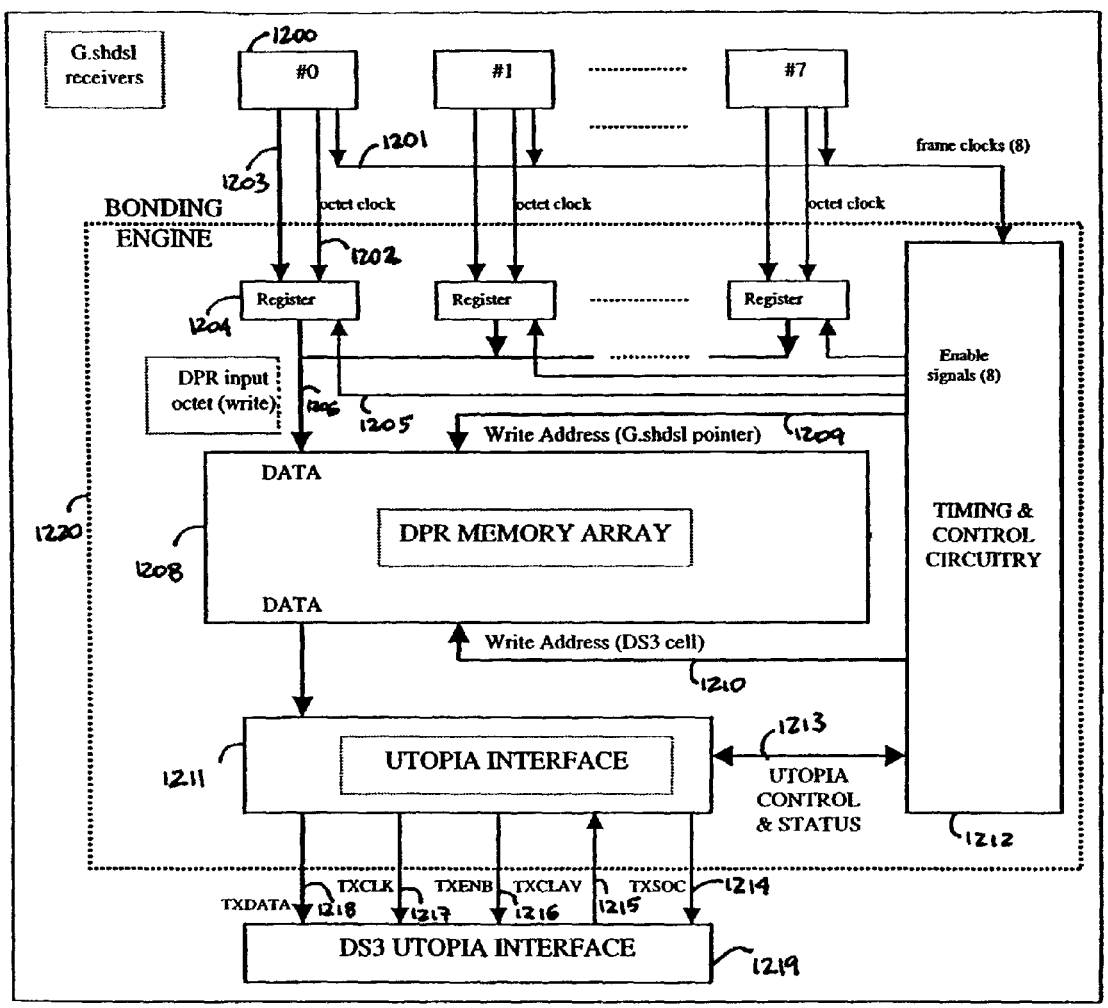
FIG. 12 illustrates a block diagram of a bonding engine circuit operating in a G.shdsl-to-DS3 direction, representing an embodiment of the invention.

Referring to FIG. 12, a block diagram of another bonding engine circuit operating in a G.shdsl-to-DS3 direction is depicted. A G.shdsl transmitter 1200 is coupled to a register 1204 via a digital line 1203 and an octet clock line 1202. The G.shdsl transmitter is also coupled to a timing and control circuitry 1212 via a frame clock line 1201. The register 1204 is coupled to a DPR memory array 1208 via a data line 1206. The register 1204 is also coupled to the timing and control circuitry 1212 via an enable signal line 1205. The DPR memory array 1208 is coupled to an utopia interface 1211.

Still referring to FIG. 12, the timing and control circuit 1212 is coupled to the DPR memory array 1208 via a write address line 1209 and a read address line 1210. The timing and control circuit 1212 is also coupled to the utopia interface 1211 via an utopia control and status line 1213. The utopia interface 1211 is coupled to a DS3 utopia interface 1219 via a TXSOC line 1214, a TXCLAV line 1215, a TXENB line 1216, a TXCLK line 1217 and a TXDATA line 1218.

Still referring to FIG. 12, this exemplary embodiment can comprise eight G.shdsl transmitters and eight respective registers. In the G.shdsl-to-DS3 direction cells are read from the DPR memory array 1208 and delivered to the DS3 utopia interface 1219 over the utopia bus. The G.shdsl receiver 1200 writes octets into the DRP memory array 1208 after extracting them from the G.shdsl link. As mentioned before, the G.shdsl write operation is treated as though all 8 transmitters were writing octets simultaneously. The G.shdsl write pointer, represented by the write address line 1209, thus identifies the layer (sub-block or Extended-ATM cell) into which octets are being written. To avoid memory access contention, it suffices that the DS3-read operation be constrained such that the G.shdsl-write-layer is avoided.

Still referring to FIG. 12, though not necessary, it is helpful to make the "read" operation a "read-modify-write" operation. The octet from the DPR memory array 1208 is read out and passed to the DS3 utopia interface 1219. In the same location a fixed pattern, preferably all-1s (octet=11111111 in binary), is written back. An alternative is to write the all-1s octet into the sequence octet after the Extended-ATM cell has been read out of memory.

Still referring to FIG. 12, the DS3 receive circuitry is represented by the DS3 utopia interface 1211, emphasizing that the transfer mechanism uses the Utopia Bus architecture (details of the receive circuitry are omitted for simplicity), and also emphasizing that any source/destination is possible, not just DS3. Similarly, only the key interface signals of the G.shdsl receiver 1200 are shown.

Still referring to FIG. 12, the bonding engine 1220 will be, in Utopia parlance, the "ATM layer" or master of the Utopia bus. For this application Utopia-Level-1 architecture suffices. The bonding engine 1220 provides the requisite control signals. The TXCLK line 1217 is a clock signal for timing data transfer. The TXDATA line 1218 is the octet-wide data bus for delivering octets to the DS3 utopia interface 1219 from the bonding engine. The TXENB line 1216 is an enable signal. The DS3 utopia interface 1219 provides the appropriate status signals. The TXCLAV line 1215 is a signal indicating that a cell can be accepted (or not). The TXSOC line 1214 is a signal to indicate "start-of-cell" and is asserted when the octet being transferred is the first octet of a 53-octet (regular) ATM cell. The utopia interface 1211 in the bonding engine 1220 performs the function of checking the sequence number for the sequence octet and determining whether the Extended-ATM cell read out of memory is a filler cell or actual traffic. It reads 54 octets from the DPR memory array 1208 for each ATM cell, and provides the requisite control signals to the DS3 utopia interface 1219.

Still referring to FIG. 12, data destined to the DPR memory array 1208 from the G.shdsl receiver 1200 is stored temporarily in registers using the "octet clock" signal provided by each receiver. The receiver nominally operates in a frame-synchronous manner and provide an individual frame clock line 1201 signal. All G.shdsl transmitters at the far end are operating synchronously. However, vagaries of transmission (cable conditions, for example) may introduce a slight differential delay between the 8 G.shdsl receive payloads. The octet clocks will, however, have the same frequency (time interval). The implementation shown assumes that this differential delay is small, less than one interval of the octet clock. Within each octet clock period, 8 separate write operations are performed using the same (sub-block)(octet) address but with (module) ranging from 0 through 7. The octets are stored in the 8 registers using individual octet clock control signals but enabled (for writing into the DPR memory array 1208) individually. This arrangement, in effect, allows us to consider the DPR-write operation for the eight G.shdsl receivers as "simultaneous".

Still referring to FIG. 12, in a write operation, octets are written to the DPR memory array 1208 and transferred from the G.shdsl receiver 1200 continuously, and the memory sequencing is sequential. The read operation is "bursty", considering that a read operation is done only if a cell is available to send to the DS3 utopia interface 1211. Furthermore, the DS3 cell-rate, equivalent to more than 30 Mbps is much greater than the aggregate payload rate of the G.shdsl links.

In the G.shdsl-to-DS3 direction, the following observations can be made. Since the DS3 line rate is so much higher than the aggregate G.shdsl payload rate, there will always be a "Cell Available" status from the DS3 interface (it can always receive cells). It is unlikely that the G.shdsl-write will "catch up" with the DS3 read. In fact the opposite is true. It will always be the DS3-read following on the heels of the G.shdsl-write. It suffices to ensure that the DS3-read be performed from the layer below (treating the memory as a circular arrangement) that which the G.shdsl side is accessing. There is a distinct advantage to making the sequence octet the first octet of the Extended-ATM cell, followed by the 53 octets of the normal ATM cell, followed by spare octets if any. Thus after the first octet read, the DS3 side can, by examining the leading bits of the sequence octet, make a quick determination as to whether the Extended-ATM cell contains valid data or is a filler.

Still referring to FIG. 12, in the G.shdsl-to-DS3 direction the writing of cells into the DPR memory array 1208 is sequential, and the reading of cells is also sequential. The need to prevent memory contention (the two sides accessing the same memory location), it is still necessary but it suffices that the read and write operations be constrained to different layers.

Still referring to FIG. 12, the method of operation, and the implicit description of the circuitry required in the timing and control circuitry 1212 is described below in an algorithmic format. It is assumed that when an Extended-ATM cell is written, it is written in its entirety (53 ATM cell octets plus sequence octet plus filler octets). When read out, the sequence octet is required to ascertain whether the Extended-ATM cell has valid data, and if it does it suffices that just the 53 octets of the regular ATM-cells be extracted from the DPR memory array 1208 for transmission to the DS3 utopia 1219 interface. Consequently, in the discussion of control flow below, only the location of sub-blocks (Extended-ATM cells) in the DPR array and this is expressed by the pair (l,k) corresponding to (sub-block) (module) needs to be considered.

It can be advantageous to denote the last cell-address used to read (by the DS3 side) from the DPR by $(l_D, k_D)$. The next cell address, being sequential, would be obtained by incrementing $k_D$ modulo-8 and if there was a roll-over, incrementing $l_D$ modulo-L. Denote this next (potential) cell-address by $(\lambda_D, \kappa_D)$. The G.shdsl pointer is in some layer (sub-block). Denote this layer by $l_G$. The algorithm follows.

Step 0: Compute $(\lambda_D, \kappa_D)$.

Step 1 Check if there is a potential conflict. Is $\lambda_D = l_G$? If YES, go to step 1A; if NO, go to step 1B.

Step 1A $\{(\lambda_D = l_G?) = YES\}$: This implies that the next DS3-cell, if accessed in the "normal sequential" manner, will have a memory contention with the G.shdsl write operation. The action is to "WAIT". That is, keep $(l_D, k_D)$ unchanged and go to step 0.

Step 1B $\{(\lambda_D = l_G?) = NO\}$: This implies that the next DS3-cell will not have a memory contention with the G.shdsl write operation. Go to step 2.

Step 2: Check if a cell can be accepted by the UTOPIA (DS3) interface. If YES go to step 2A; if NO then go to step 2B. The higher speed of the DS3 guarantees that the answer will be YES. However, the NO branch is included for completeness (and possible error detection).

Step 2A {a cell can be accepted}: Examine the sequence octet and read the Extended-ATM cell from the cell address determined by $(\lambda_D, \kappa_D)$ If the sequence octet identifies this as a traffic ATM cell, transfer the appropriate 53 octets to the DS3 interface over the UTOPIA Bus. Then set $(l_D, k_D) = (\lambda_D, \kappa_D)$ and go to step 0.

Step 2B {cell cannot be accepted}: The action is to "WAIT". That is, keep $(l_D, k_D)$ unchanged and go to step 0. If necessary an alarm handling procedure can be initiated.

The impact of this algorithm is that the DS3-read is always "behind" the G.shdsl-write. By remaining in separate layers, memory access contention is avoided.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Practical Applications of the Invention

A practical application of the invention that has value within the technological arts is transporting ATM traffic, such as DS3 (T3) over (multiple) G.shdsl links. Further, the invention is useful in conjunction with digital subscriber loops, or in conjunction with ATM networks, or the like. There are virtually innumerable uses for the invention, all of which need not be detailed here.

Advantages of the Invention

Deploying G.shdsl in backhaul applications, representing an embodiment of the invention, can be cost effective and advantageous for at least the following reasons. The invention permits DSL components, such as DSLAMs, to be utilized without the need to install, or lease, expensive DSL interconnections between a DSL component and a central office. The invention improves quality and/or reduces costs compared to previous approaches.

All the disclosed embodiments of the invention disclosed herein can be made and used without undue experimentation in light of the disclosure. Although the best mode of carrying out the invention contemplated by the inventor is disclosed, practice of the invention is not limited thereto. Accordingly, it will be appreciated by those skilled in the art that the invention may be practiced otherwise than as specifically described herein.

Further, the individual components need not be combined in the disclosed configurations, but could be combined in virtually all configurations. Further, although the apparatus for deploying G.shdsl in DS3 backhaul applications described herein can be a separate subsystem or module, it will be manifest that the apparatus for deploying G.shdsl in DS3 backhaul applications may be integrated into a system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

[1] Walter J. Goralski, Introduction to ATM Networking, McGraw-Hill Series on Computer Communications, 1995, ISBN 0-07-024043-4.

[2] G.991.2 (ex G.shdsl), Single-Pair High-Speed Digital Subscriber Line (SHDSL) Transceivers, ITU-T (Draft) Recommendation, April 2000 [formal release of G.991.2 is imminent].

[3] PMC-Sierra Inc., Data Sheet for PM7347 S/UNI-JET and associated documentation including Application Notes.

[4] Xilinx Inc, documentation associated with Virtex-E Field Programmable Gate Arrays (FPGAs), currently available at www.xilinx.com.

[5] Globespan, Inc, product documentation for the Globespan line of G.shdsl chip-sets.

[6] af-phy-0017.000, UTOPIA Specification Level 1, Version 2.01, The ATM Technical Forum, Mar. 21, 1994.

[7] af-phy-0039.000, UTOPIA Specification Level 2, Version 1.0, The ATM Technical Forum, June 1995.

What is claimed is:

1. A method, comprising transporting digital data in a backhaul application, the data being transferred as a sequence of blocks having payload bits k=96n, where n is a negotiated parameter, including:
    coupling a first end of a plurality of unbundled network elements to a first G.shdsl modem with bonding capabilities;
    coupling a second end of the plurality of unbundled network elements to a second G.shdsl modem with bonding capability;
    providing the first modem with a first single stream of asynchronous transfer mode cells;
    negotiating the parameter n for transmission between the first and second modem during initialization;
    sequence-cell division multiplexing to divide the first single stream of asynchronous transfer mode cells into a plurality of streams of cells at the first modem;
    transmitting the plurality of streams of cells to the second modem via the plurality of unbundled network elements utilizing a plurality of G.shdsl transceivers; and
    sequence-cell division demultiplexing to bond the plurality of streams of cells into a second single stream of asynchronous transfer mode cells at the second modem and enable the backhaul application of digital data transfer.

2. The method of claim 1, wherein coupling the first end of the plurality of unbundled network elements to the first modem includes coupling the first end of a plurality of unbundled network elements to a first modem with bonding capabilities.

3. The method of claim 1, wherein coupling the first end of the plurality of unbundled network elements to the first modem includes coupling the first end of a set of eight unbundled network elements to the first modem.

4. The method of claim 1, wherein coupling the second end of the plurality of unbundled network elements to the second modem includes coupling the second end of the plurality of unbundled network elements to a second modem with bonding capabilities.

5. The method of claim 1, wherein coupling the second end of the plurality of unbundled network elements to the second modem includes coupling the second end of a set of eight unbundled network elements to the second modem.

6. The method of claim 1, wherein transmitting includes synchronously transmitting, and a dual port random (DPR) access memory module is associated with each of the G.shdsl transmitters, all of which are frame synchronized.

7. The method of claim 6, wherein the transmission is organized as a sequential access from the DPR access memory module spread over the multiple transmitters.

8. The method of claim 7, wherein write operations occur in a different sub-block in the DPR access memory module than read operations so that memory contention does not occur.

9. The method of claim 1, wherein sequence-cell division multiplexing to divide the single stream of asynchronous transfer mode cells includes:
    splitting the single stream of asynchronous transfer mode cells into a plurality of asynchronous transfer mode cells modules;
    writing each of a plurality of asynchronous transfer mode cell modules to each of a plurality of memory modules;

reading each of a set of octets from each of the plurality of memory modules; and bonding each of the set of octets into each of the plurality of streams of cells.

10. The method of claim 9, wherein writing includes synchronously writing, and a dual port random (DPR) access memory module is associated with each of the G.shdsl transmitters, wherein all of the transmitters are frame synchronized.

11. The method of claim 9, wherein writing includes writing utilizing a round-robin algorithm.

12. The method of claim 9, wherein writing each of the plurality of asynchronous transfer mode cell modules to each of the plurality of memory modules includes writing each of the plurality of asynchronous transfer mode cell modules to each of a plurality of dual-port random (DPR) access memory modules, each of the memory module having a capacity to store a number of sub-blocks in a G.shdsl frame.

13. The method of claim 9, wherein reading includes synchronously reading.

14. The method of claim 9, wherein reading includes reading utilizing a round-robin algorithm.

15. The method of claim 9, wherein reading includes reading utilizing a plurality of registers.

16. The method of claim 1, wherein sequence-cell division demultiplexing includes:

receiving the plurality of streams of cells;

writing each of an array of asynchronous transfer mode cell modules to each of an array of memory modules;

reading a plurality of octets from each of the array of memory modules; and bonding the plurality of octets into another single stream of asynchronous transfer mode cells.

17. The method of claim 16, wherein writing includes synchronously writing.

18. The method of claim 16, wherein writing includes writing utilizing a round-robin algorithm.

19. The method of claim 16, wherein writing each of the array of asynchronous transfer mode cell modules to each of the array of memory modules includes writing each of the array of asynchronous transfer mode cell modules to each of an array of dual-port random access memory modules.

20. The method of claim 16, wherein reading includes synchronously reading.

21. The method of claim 16, wherein reading includes reading utilizing a round-robin algorithm.

* * * * *